US009944272B2

United States Patent
Rauma et al.

(10) Patent No.: US 9,944,272 B2
(45) Date of Patent: Apr. 17, 2018

(54) ELECTROMECHANICAL POWER TRANSMISSION CHAIN FOR A WORKING MACHINE

(71) Applicant: Visedo Oy, Lappeenranta (FI)

(72) Inventors: Kimmo Rauma, Lappeenranta (FI); Tero Jarvelainen, Lappeenranta (FI)

(73) Assignee: VISEDO OY, Lappeenranta (FI)

( * ) Notice: Subject to any disclaimer, the term of this patent is extended or adjusted under 35 U.S.C. 154(b) by 163 days.

(21) Appl. No.: 14/944,530

(22) Filed: Nov. 18, 2015

(65) Prior Publication Data

US 2016/0144851 A1  May 26, 2016

(30) Foreign Application Priority Data

Nov. 21, 2014 (EP) .................................... 14194287

(51) Int. Cl.
*B60W 20/15* (2016.01)
*B60K 6/442* (2007.10)
(Continued)

(52) U.S. Cl.
CPC ............. *B60W 20/15* (2016.01); *B60K 6/442* (2013.01); *B60K 6/46* (2013.01); *B60L 11/005* (2013.01);
(Continued)

(58) Field of Classification Search
CPC ...... B60W 20/15; B60W 10/06; B60W 10/08; B60W 10/26; B60W 2710/086;
(Continued)

(56) References Cited

U.S. PATENT DOCUMENTS 6,719,076 B1 * 4/2004 Tabata .................. B60W 20/30
180/65.7
2003/0231304 A1 12/2003 Chan et al.
(Continued)

FOREIGN PATENT DOCUMENTS

EP  1 160 119 A1  12/2001
EP  1 863 668     12/2007
(Continued)

OTHER PUBLICATIONS

Search Report issued in European Application No. 14194287.0, dated Dec. 22, 2016.
(Continued)

*Primary Examiner* — Thomas Ingram
(74) *Attorney, Agent, or Firm* — Young & Thompson

(57) ABSTRACT

An electromechanical power transmission chain comprises an electrical machine (101) connectable to a combustion engine and to a mechanical load, a storage circuit (104) for storing electrical energy, an electronic power converter (109) for transferring electrical energy between the storage circuit and the electrical machine, and a control system (110) for controlling the combustion engine and the electronic power converter. The control system controls the electronic power converter to transfer electrical energy from the storage circuit to the electrical machine in response to a peak-load situation where power demand of the mechanical load is above an advantageous power range of the combustion engine. The control system limits the fuel supply of the combustion engine during the peak-load situation so as to restrain the fuel consumption from increasing due to the peak-load situation.

15 Claims, 3 Drawing Sheets

(51) Int. Cl.
*B60K 6/46* (2007.10)
*B60L 11/00* (2006.01)
*B60L 11/12* (2006.01)
*B60W 10/08* (2006.01)
*B60W 10/26* (2006.01)
*B60W 10/06* (2006.01)
*F02D 41/24* (2006.01)
*F02D 41/26* (2006.01)
*F02D 41/30* (2006.01)

(52) U.S. Cl.
CPC .............. *B60L 11/12* (2013.01); *B60L 11/123* (2013.01); *B60L 11/126* (2013.01); *B60W 10/06* (2013.01); *B60W 10/08* (2013.01); *B60W 10/26* (2013.01); *F02D 41/2406* (2013.01); *F02D 41/26* (2013.01); *F02D 41/3005* (2013.01); *B60L 2200/40* (2013.01); *B60L 2240/44* (2013.01); *B60L 2240/443* (2013.01); *B60W 2710/0616* (2013.01); *B60W 2710/086* (2013.01); *Y02T 10/6217* (2013.01); *Y02T 10/7022* (2013.01); *Y02T 10/7077* (2013.01); *Y10S 903/93* (2013.01)

(58) Field of Classification Search
CPC ........ B60W 2710/0616; F02D 41/3005; F02D 41/2406; F02D 41/26; B60L 11/123; B60L 2240/443; B60L 2200/40; B60L 2240/44; B60K 6/442; B60K 6/46; Y02T 10/6217; Y02T 10/7077; Y02T 10/7022; Y10S 903/93

See application file for complete search history.

(56) References Cited

U.S. PATENT DOCUMENTS

| | | | |
|---|---|---|---|
| 2006/0231304 A1* | 10/2006 | Severinsky | B60H 1/004 180/65.23 |
| 2011/0070992 A1* | 3/2011 | Si | B60K 6/365 475/149 |
| 2011/0174561 A1 | 7/2011 | Bowman | |
| 2014/0229048 A1* | 8/2014 | Kawata | B60K 6/48 701/22 |

FOREIGN PATENT DOCUMENTS

| | | |
|---|---|---|
| EP | 2 682 963 A1 | 1/2014 |
| EP | 2 754 595 A1 | 7/2014 |
| WO | 2006/106894 A1 | 10/2006 |
| WO | 2013/014510 A1 | 1/2013 |

OTHER PUBLICATIONS

EP Search Report, dated Jul. 2, 2015, from corresponding EP application.

* cited by examiner

ELECTROMECHANICAL POWER TRANSMISSION CHAIN FOR A WORKING MACHINE

FIELD OF THE INVENTION

The invention relates to an electromechanical power transmission chain that can be for example a part of a working machine. Furthermore, the invention relates to a method and to a computer program for controlling an electromechanical power transmission chain. Furthermore, the invention relates to a working machine.

BACKGROUND

An electromechanical power transmission chain comprises typically one or more electrical machines and one or more electronic power converters. The electromechanical power transmission chain can be a series transmission chain where one of the electrical machines operates as a generator and the one or more electronic power converters are arranged to convert the voltages produced by the generator into voltages having amplitudes and frequencies suitable for the one or more other electrical machines. The generator can be driven with a combustion engine that can be e.g. a diesel engine, an Otto-cycle engine, or a turbine engine. The other electrical machines can be, for example, electrical motors arranged to drive wheels, chain tracks, and/or other mechanical loads. An electromechanical power transmission chain can be as well a parallel transmission chain where an electrical machine that is mechanically connected to a combustion engine operates sometimes as a generator which charges a storage circuit for storing electrical energy and sometimes as a motor that receives electrical energy from the storage circuit and assists the combustion engine when high mechanical output power is needed. It is also possible that an electromechanical power transmission chain is a combined series-parallel transmission chain so that one or more electrical machines are mechanically connected both to a combustion engine and to a mechanical load and one more other electrical machines are configured to drive other mechanical loads in the same way as in a series transmission chain.

Electromechanical power transmission chains of the kind described above provide advantages compared to a traditional mechanical power transmission chain because, for example, the operation area of the combustion engine can be more freely selected from the viewpoint of the operational efficiency of the combustion engine, and thus savings in the fuel costs can be achieved. In parallel transmission chains the operation area of the combustion engine cannot be, however, chosen so freely as in series transmission chains because in a parallel transmission chain an electrical machine is mechanically connected both to a combustion engine and to a mechanical load and thus the required rotational speed of the mechanical load dictates also the rotational speed of the combustion engine. The fuel consumption of the combustion engine tends to increase especially in such peak-load situations where the power demand of the mechanical load is above a power range where the combustion engine operates at, or at least near to, its optimal operational efficiency.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new electromechanical power transmission chain that can be for example a part of a working machine. An electromechanical power transmission chain according to the invention comprises:

- an electrical machine having a rotor for being in a torque transfer connection with a shaft of a combustion engine and with a mechanical load to be driven, the operational efficiency of the combustion engine being better when the power produced by the combustion engine is on a pre-determined power range than when the power produced by the combustion engine is above the pre-determined power range,
- a storage circuit for storing electrical energy,
- an electronic power converter for transferring electrical energy between the storage circuit and the electrical machine, and
- a control system for controlling the combustion engine and the electronic power converter.

The control system is configured to control the electronic power converter to transfer electrical energy from the storage circuit to the electrical machine in response to a peak-load situation in which i) power demand of the mechanical load is above a pre-determined power range and ii) rotational speed is increased, so as to keep the power produced by the combustion engine on the pre-determined power range. The control system is further configured to reduce fuel injection amount per each working stroke of the combustion engine during the peak-load situation so as to restrain the fuel consumption of the combustion engine from increasing in response to the peak-load situation. The pre-determined power range is advantageously a power range where the combustion engine operates at, or at least near to, its optimal operational efficiency.

The limitation of the fuel supply compensates for the inherent property of many combustion engines to increase their fuel consumption in peak-load situations where the rotational speed is to be increased. For example, in typical peak-load situations where the rotational speed increases, the fuel flow rate via an injection pump of a diesel engine increases if the injection amount per each working stroke is kept constant or increased. The time average of the fuel consumption can be decreased by reducing the injection amount per each working stroke and by taking the required additional power from the storage circuit with the aid of the electrical machine during peak-load situations, and by charging the storage circuit when the power demand of the mechanical load is below the power range where the combustion engine operates at, or at least near to, its optimal operational efficiency.

In accordance with the invention, there is provided also a new working machine that can be, for example but not necessarily, a tractor, a bucket charger, a road drag, an excavator, a bulldozer, a stone crusher, or a wood chipping machine. The working machine according to the invention comprises:

- a combustion engine,
- a functional element to be driven with mechanical power, and an electromechanical power transmission chain according to the invention.

The rotor of the electrical machine of the electromechanical power transmission chain is in a torque transfer connection with a shaft of the combustion engine and with the functional element.

The above-mentioned functional element of the working machine can be for example a hydraulic pump of a hydraulic system of the working machine. The hydraulic system can be configured to drive one or more actuators of the working machine, e.g. a bucket of a bucket charger or a hydraulic motor operating a rotary base of an excavator. In this case, the working machine comprises advantageously a liquid cooling system arranged to cool both the hydraulic system and the electromechanical power transmission chain.

In accordance with the invention there is provided also a new method for controlling an electromechanical power transmission chain that comprises:

an electrical machine a having a rotor in a torque transfer connection with a shaft of a combustion engine and with a mechanical load to be driven, operational efficiency of the combustion engine being better when the power produced by the combustion engine is on a pre-determined power range than when the power produced by the combustion engine is above the pre-determined power range, a storage circuit for storing electrical energy, and an electronic power converter for transferring electrical energy between the storage circuit and the electrical machine.

A method according to the invention comprises:

controlling the electronic power converter to transfer electrical energy from the storage circuit to the electrical machine in response to a peak-load situation in which i) power demand of the mechanical load is above a pre-determined power range and ii) rotational speed is increased, so as to keep the power produced by the combustion engine on the pre-determined power range, and limiting fuel supply of the combustion engine by reducing fuel injection amount per each working stroke of the combustion engine during the peak-load situation so as to restrain the fuel consumption of the combustion engine from increasing in response to the peak-load situation.

In accordance with the invention there is provided also a new computer program for controlling the above-mentioned electromechanical power transmission chain. A computer program according to the invention comprises computer executable instructions for controlling a programmable processing system to:

control the electronic power converter to transfer electrical energy from the storage circuit to the electrical machine in response to a peak-load situation in which i) power demand of the mechanical load is above the pre-determined power range of the combustion engine and ii) rotational speed is increased, so as to keep the power produced by the combustion engine on the pre-determined power range, and reduce fuel injection amount per each working stroke of the combustion engine during the peak-load situation so as to restrain the fuel consumption of the combustion engine from increasing in response to the peak-load situation.

A computer program product according to the invention comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

Figure 1:
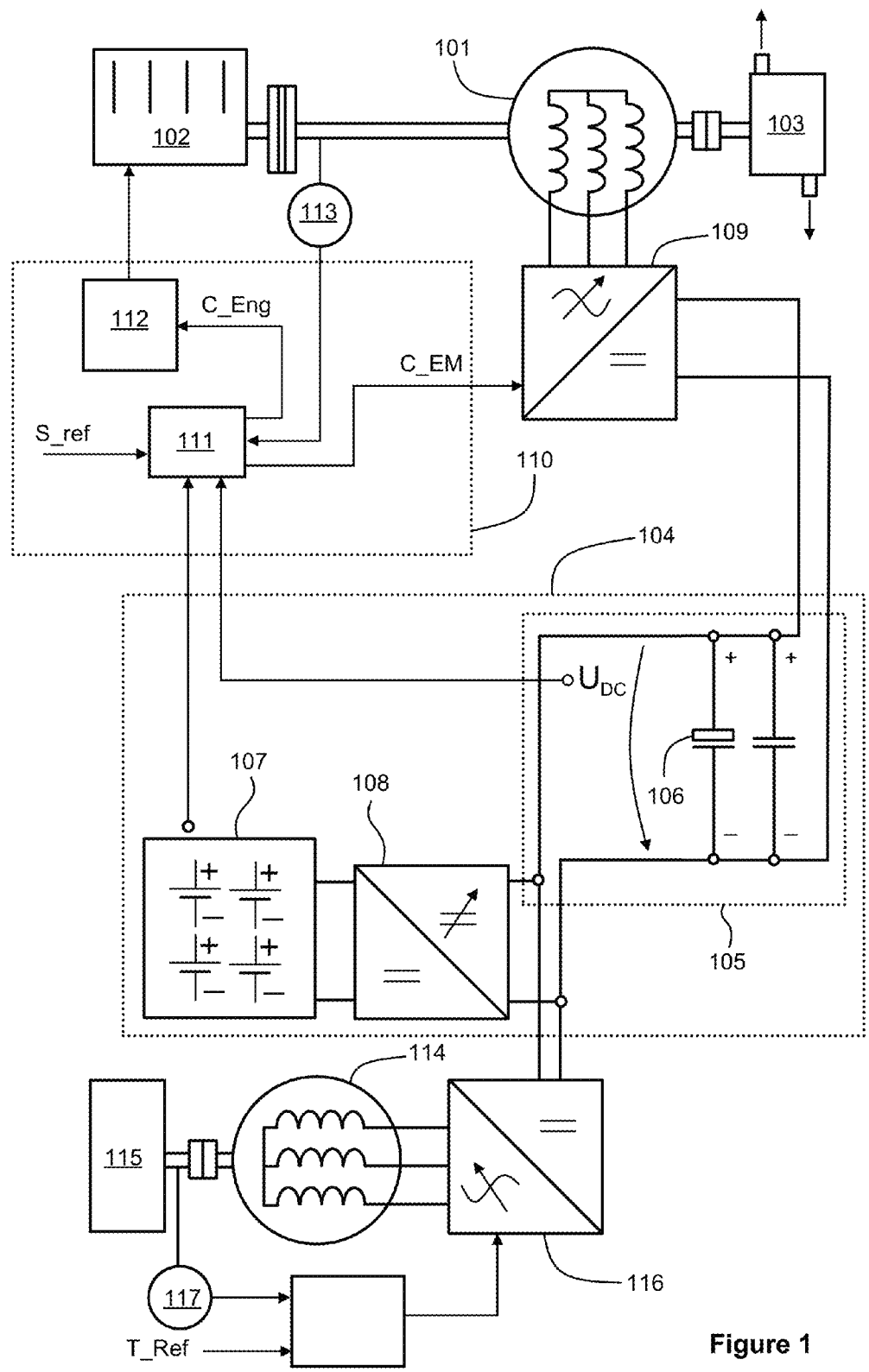
FIG. 1 shows a schematic illustration of an electromechanical power transmission chain according to an exemplifying and non-limiting embodiment of the invention.

FIG. 1 shows a schematic illustration of an electromechanical power transmission chain according to an exemplifying and non-limiting embodiment of the invention. The electromechanical power transmission chain comprises an electrical machine 101 that has a rotor in a torque transfer connection with a shaft of a combustion engine 102 and with a mechanical load 103 to be driven. The combustion engine 102 can be for example a diesel engine, an Otto-cycle engine, or a turbine engine. The electrical machine 101 can be for example an electrically excited synchronous machine, a permanent magnet synchronous machine, or an induction machine. The mechanical load 103 can be for example a hydraulic pump of a hydraulic system. In the exemplifying case illustrated in FIG. 1, the rotor of the electrical machine 101 is directly connected to the shaft of the combustion engine 102 and to the mechanical load 103. It is, however, also possible that there is a gear between the electrical machine and the combustion engine and/or between the electrical machine and the mechanical load. The electromechanical power transmission chain comprises a storage circuit 104 for storing electrical energy. In the exemplifying case illustrated in FIG. 1, the storage circuit 104 comprises a capacitive circuit 105 where the electrical energy E stored by the capacitive circuit 105 is directly proportional to the square of voltage $U_{DC}$, i.e. $E=\frac{1}{2}CU_{DC}^2$, where C is the capacitance of the capacitive circuit 105. The capacitive circuit 105 may comprise an electric double layer capacitor "EDLC" 106 in order to increase the energy storing capacity of the capacitive circuit. An EDLC is sometimes called a "super capacitor". In some other cases, the storage circuit may comprise an inductive circuit where the stored electrical energy is $\frac{1}{2}LI^2$, where L is the inductance of the inductive circuit and I is current of the inductive circuit. The storage circuit 104 may further comprise a battery element 107 and a controllable direct voltage converter 108 for transferring electrical energy between the capacitive circuit 105 and the battery element 107. The electromechanical power transmission chain comprises an electronic power converter 109 for transferring electrical energy between the storage circuit 104 and the electrical machine 101. The electromechanical power transmission chain comprises a control system 110 for controlling the combustion engine 102 and the electronic power converter 109. The control system 110 is configured to control the electronic power converter 109 so that the electrical machine 101 operates sometimes as a generator which charges the storage circuit 104 and sometimes as a motor that receives electrical energy from the storage circuit 104 and assists the combustion engine 102 when high mechanical output power is needed. The control system 110 is configured to control the electronic power converter 109 to transfer electrical energy from the storage circuit 104 to the electrical machine 101 especially in peak-load situations where the power demand of the mechanical load 103 is above an advantageous power range of the combustion engine. The advantageous power range is a power range where the combustion engine 102 operates at, or at least near to, its optimum operational efficiency. The advantageous power range is typically dependent on the rotational speed of the combustion engine. The control system 110 is configured to limit the fuel supply of the combustion engine 102 during the peak-load situations so as to restrain the fuel consumption of the combustion engine from increasing in the peak-load situations. The above-mentioned operational efficiency can be expressed e.g. as a ratio of the mechanical power of the combustion engine to the fuel consumption of the combustion engine. The fuel consumption can be expressed e.g. in grams per second.

In an electromechanical power transmission chain according to an exemplifying and non-limiting embodiment of the invention, the control system 110 is configured to interrupt the fuel supply of the combustion engine 102 during the peak-load situations.

In an electromechanical power transmission chain according to another exemplifying and non-limiting embodiment of the invention, the control system 110 is configured to limit the fuel consumption of the combustion engine to be, during the peak-load situations, substantially the same as the fuel consumption on the advantageous power range where the combustion engine 102 operates at, or at least near to, its optimum operational efficiency.

In the exemplifying case shown in FIG. 1, the mechanical load 103 is assumed to be driven according to a speed reference S_ref and the torque and thereby the power supplied to the mechanical load 103 are determined in accordance with the characteristics of the mechanical load 103. A functional block 111 generates a first control signal C_eng for the combustion engine 102 and a second control signal C_EM for the electronic power converter 109 on the basis of the speed reference S_ref and an output signal of a rotational speed and/or position indicator 113. The control signals C_Eng and C_EM can be generated for example so that the mechanical power P_EM produced by the electrical machine is zero when the mechanical power P_load directed to the mechanical load 103 is between pre-determined minimum and maximum values $P_{min}$ and $P_{max}$, and P_EM=P_load−$P_{max}$ when P_load>$P_{max}$, and P_EM=P_load−$P_{min}$ when P_load<$P_{min}$. Hence, when high mechanical power is required, i.e. P_load>$P_{max}$, P_EM is positive and thus the electrical machine 101 operates as a motor and assists the combustion engine 102, and when only low mechanical power is required, i.e. P_load<$P_{min}$, P_EM is negative and thus the electrical machine 101 operates as a generator and charges the storage circuit 104. The pre-determined values $P_{min}$ and $P_{max}$ and the division of the mechanical power P_load between the combustion engine 102 and the electrical machine 101 are advantageously dependent on the rotational speed because the advantageous power range of the combustion engine 102 is typically dependent on the rotational speed and the capability of the combustion engine 102 to produce high mechanical power at low rotational speeds is limited. Furthermore, the division of the mechanical power is advantageously dependent on the state of charge of the battery element 107 and/or on the voltage $U_{DC}$ of the storage circuit 104.

In peak-load situations where the rotational speed has increased and the power demand of the mechanical load 103 is above the advantageous power range of the combustion engine 102, the mechanical power P_load can be divided between the combustion engine 102 and the electrical machine 101 so that the mechanical power P_eng produced by the combustion engine is limited to be at most P_frozen, where P_frozen is the mechanical power of the combustion engine just before the beginning of the peak-load situation, i.e. the mechanical power of the combustion engine is limited to be at most at a level preceding the peak-load situation. This approach for reducing the fuel consumption is possible if, in the peak-load situation, there is a sufficient amount of electrical energy available in the storage circuit 104. Otherwise, the power demand related to the peak-load situation has to be covered by increasing the power of the combustion engine 102.

The exemplifying electromechanical power transmission chain illustrated in FIG. 1 comprises also another electrical machine 114 connected to a mechanical load 115. The electrical machine 114 is controlled with an electronic power converter 116 on the basis of a torque reference T_ref and an output signal of a rotational speed and/or position indicator 117. Therefore, the exemplifying electromechanical power transmission chain illustrated in FIG. 1 is a combined series-parallel transmission chain so that the electrical machine 101 is mechanically connected both to the combustion engine 102 and to the mechanical load 103 and the other electrical machine is configured to drive the other mechanical load 115 in the same way as in a series transmission chain.

The control system 110 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the control system 110 may comprise one or more memory circuits such as e.g. random-access memory "RAM" circuits.

Figure 2:
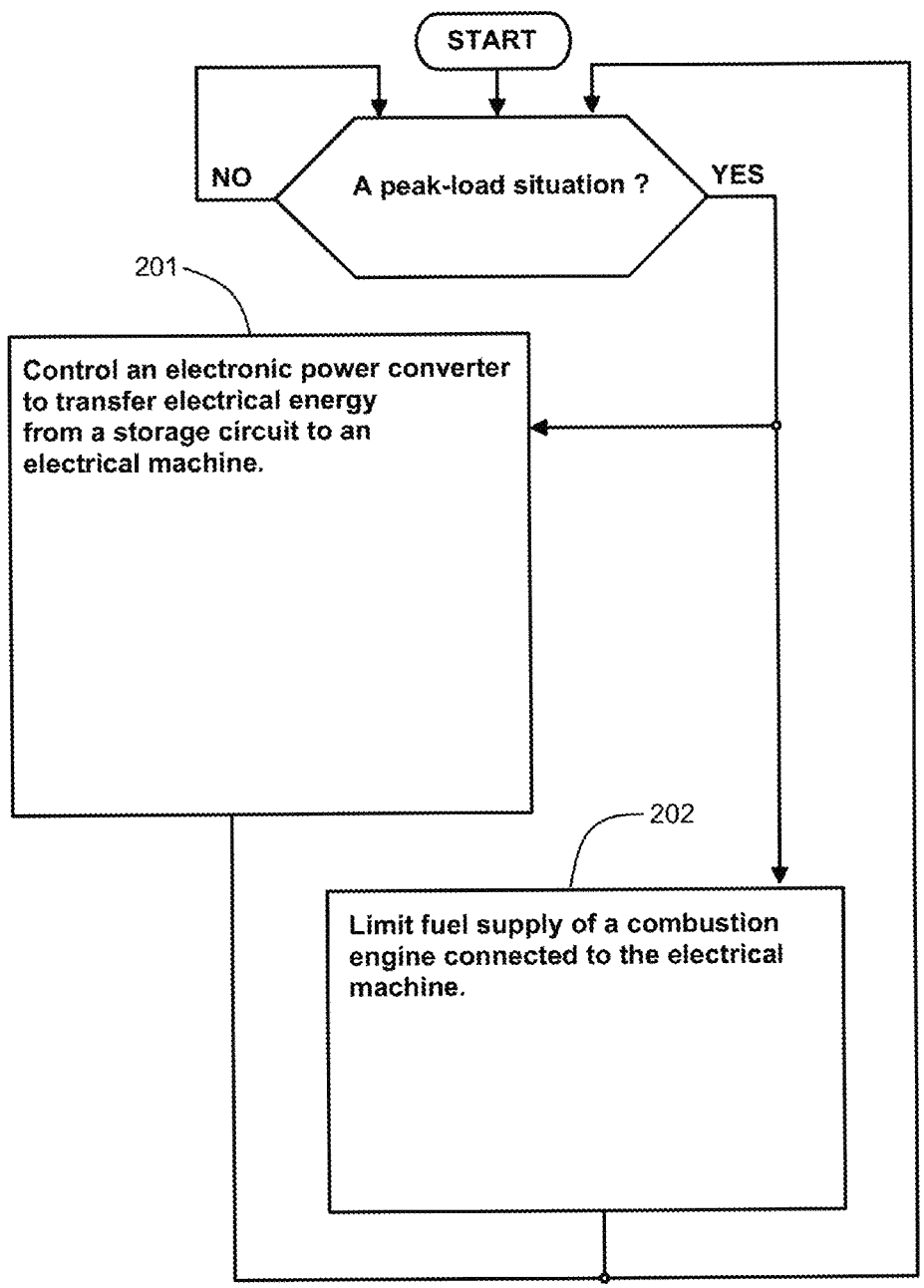
FIG. 2 shows a flowchart of a method according to an exemplifying and non-limiting embodiment of the invention for controlling an electromechanical power transmission chain.

FIG. 2 shows a flowchart of a method according to an exemplifying and non-limiting embodiment of the invention for controlling an electromechanical power transmission chain that comprises:

an electrical machine a having a rotor in a torque transfer connection with a shaft of a combustion engine and with a mechanical load to be driven, a storage circuit for storing electrical energy, and an electronic power converter for transferring electrical energy between the storage circuit and the electrical machine.

The method comprises the following actions:

action 201: controlling the electronic power converter to transfer electrical energy from the storage circuit to the electrical machine in response to a peak-load situation in which power demand the mechanical load is above a pre-determined power range of the combustion engine, and action 202: limiting fuel supply of the combustion engine during the peak-load situation so as to restrain the fuel consumption of the combustion engine from increasing in response to the peak-load situation.

The pre-determined power range is advantageously a power range where the combustion engine operates at, or at least near to, its optimal operational efficiency.

In method according to an exemplifying and non-limiting embodiment of the invention, the action 202 comprises interrupting the fuel supply of the combustion engine during the peak-load situation.

In method according to another exemplifying and non-limiting embodiment of the invention, the action 202 comprises limiting the fuel consumption of the combustion engine to be, during the peak-load situation, substantially the same as the fuel consumption on the pre-determined power range.

A computer program according to an exemplifying and non-limiting embodiment of the invention for controlling an electromechanical power transmission chain comprises computer executable instructions for controlling a programmable processing system to carry out a method according to any of the above-described exemplifying embodiments of the invention.

A computer program according to an exemplifying and non-limiting embodiment of the invention comprises software modules for controlling an electromechanical power transmission chain that comprises:

an electrical machine a having a rotor shaft connected to a shaft of a combustion engine and to a mechanical load to be driven, a storage circuit for storing electrical energy, and an electronic power converter for transferring electrical energy between the storage circuit and the electrical machine.

The software modules comprise computer executable instructions for controlling a programmable processing system to:

control the electronic power converter to transfer electrical energy from the storage circuit to the electrical machine in response to a peak-load situation in which power demand of the mechanical load is above a pre-determined power range of the combustion engine, and limit fuel supply of the combustion engine during the peak-load situation so as to restrain fuel consumption of the combustion engine from increasing in response to the peak-load situation.

The software modules can be e.g. subroutines or functions implemented with a suitable programming language and with a compiler suitable for the programming language and the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a non-volatile computer readable medium, e.g. a compact disc "CD", encoded with the above-mentioned software modules.

A signal according to an exemplifying and non-limiting embodiment of the invention is encoded to carry information defining a computer program according to an embodiment of the invention.

Figure 3:
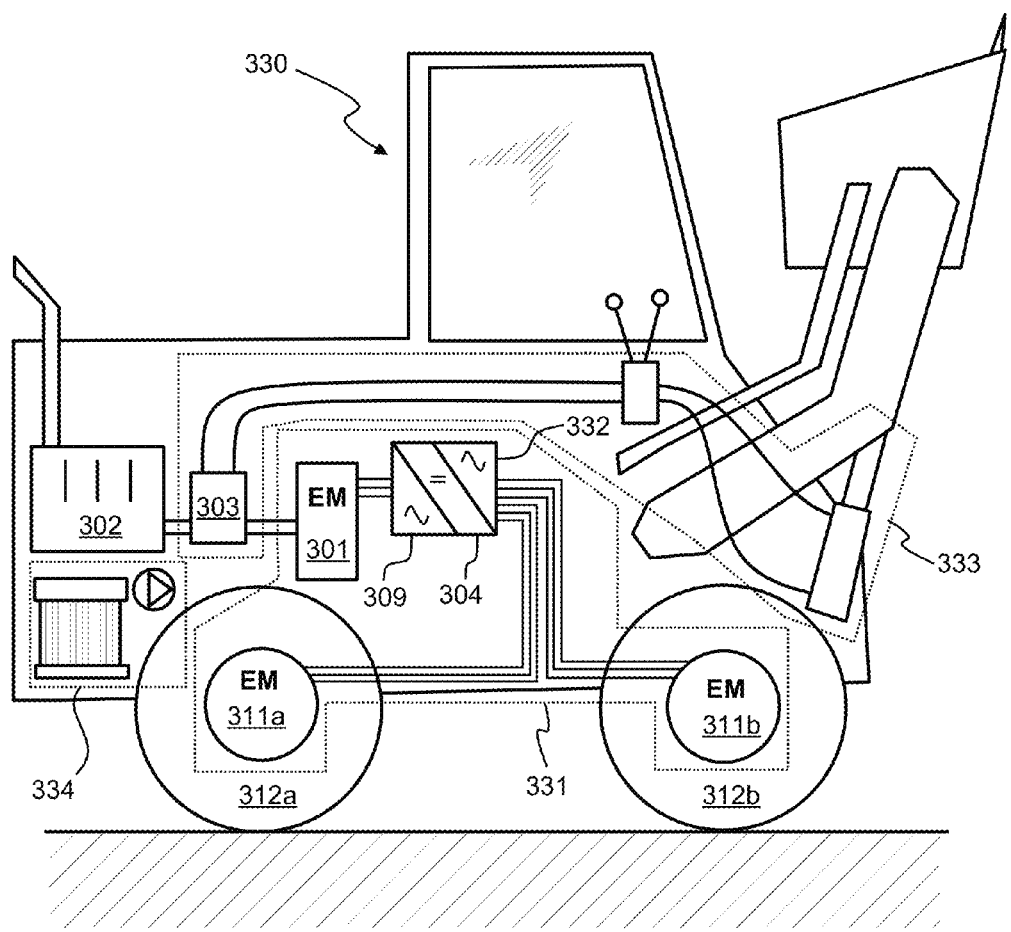
FIG. 3 shows a schematic illustration of a working machine according to an exemplifying and non-limiting embodiment of the invention.

FIG. 3 shows a schematic illustration of a working machine 330 according to an exemplifying and non-limiting embodiment of the invention. In this exemplifying case, the mobile working machine is a bucket charger but the working machine could as well be a tractor, a road drag, a bulldozer, an excavator, or any other working machine. The working machine comprises a combustion engine 302 that can be e.g. a diesel engine, an Otto-cycle engine, or a turbine engine. The working machine comprises an electromechanical power transmission chain 331 which comprises an electrical machine 301, a storage circuit 304 for storing electrical energy, and an electronic power converter 309 for transferring electrical energy between the storage circuit 304 and the electrical machine 301. The electromechanical power transmission chain 331 comprises also a control system for controlling the combustion engine 302 and the electronic power converter 309. The control system is not shown in FIG. 3. The rotor of the electrical machine 301 is in a torque transfer connection with the shaft of the combustion engine 302 and with a functional device 303. In this exemplifying case, the functional device 303 is a hydraulic pump of a hydraulic system 333 of the working machine. The control system is configured to control the electronic power converter 309 to transfer electrical energy from the storage circuit 304 to the electrical machine 301 in response to a peak-load situation where the power demand of the functional device 303 is above an advantageous power range of the combustion engine 302, i.e. the power range where the combustion engine operates at, or at least near to, its optimal operational efficiency. The control system is configured to limit the fuel supply of the combustion engine 302 during the peak-load situation so as to restrain the fuel consumption of the combustion engine from increasing in response to the peak-load situation.

In the exemplifying working machine illustrated in FIG. 3, the electromechanical transmission chain 331 further comprises electrical machines at the hubs of wheels of the working machine. In FIG. 3, two of the wheels are denoted with reference numbers 312*a* and 312*b* and two of the electrical machines at the hubs are denoted with reference numbers 311*a* and 311*b*. The electromechanical drive comprises an electrical power converter 332 which is configured to convert the direct voltage of the storage circuit 304 into voltages having amplitudes and frequencies suitable for the electrical machines driving the wheels. The electrical power converter 332 may have separate converter stages for all the electrical machines driving the wheels in which case each of these electrical machines can be controlled individually, or all the electrical machines driving the wheels can be connected to one and the same converter stage in which case these electrical machines are controlled as a group. The electromechanical power transmission chain 331 of the working machine is a combined series-parallel transmission chain so that the electrical machine 301 is mechanically connected both to the combustion engine 302 and to the functional device 303 and the other electrical machines are configured to drive the wheels in the same way as in a series transmission chain.

A mobile working machine according to an exemplifying and non-limiting embodiment of the invention comprises a liquid cooling system 334 arranged to cool the electromechanical power transmission chain 331.

In a mobile working machine according to an exemplifying and non-limiting embodiment of the invention, the liquid cooling system 334 is arranged to cool the electromechanical power transmission chain 331 and one or both of the following: the hydraulic system 333 and the combustion engine 302.

In a mobile working machine according to an exemplifying and non-limiting embodiment of the invention, the storage circuit 304 comprises a battery element arranged to respond to peak power needs exceeding the maximum power available from the combustion engine 302 and from a capacitive circuit of the storage circuit 304. The battery element can be connected to the capacitive circuit with the aid of for example a controllable direct voltage converter.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. An electromechanical power transmission chain comprising:
    an electrical machine having a rotor for being in a torque transfer connection with a shaft of a combustion engine and with a mechanical load to be driven, operational efficiency of the combustion engine being better when power produced by the combustion engine is on a pre-determined power range than when the power produced by the combustion engine is above the pre-determined power range,
    a storage circuit for storing electrical energy,
    an electronic power converter for transferring electrical energy between the storage circuit and the electrical machine, and
    a control system for controlling the combustion engine and the electronic power converter,
    wherein the control system is configured to control the electronic power converter to transfer electrical energy from the storage circuit to the electrical machine in response to a peak-load situation in which i) power demand of the mechanical load is above the pre-determined power range and ii) rotational speed is increased, so as to keep the power produced by the combustion engine on the pre-determined power range, and wherein the control system is configured to reduce a fuel injection amount per each working stroke of the combustion engine during the peak-load situation so as to restrain fuel consumption of the combustion engine from increasing in response to the peak-load situation.

2. An electromechanical power transmission chain according to claim 1, wherein the control system is configured to interrupt the fuel supply of the combustion engine during the peak-load situation.

3. An electromechanical power transmission chain according to claim 1, wherein the control system is configured to limit the fuel consumption of the combustion engine to be, during the peak-load situation, substantially a same as the fuel consumption on the pre-determined power range.

4. An electromechanical power transmission chain according to claim 1, wherein the storage circuit comprises a capacitive circuit and electrical energy stored by capacitive circuit is directly proportional to a square of voltage of the capacitive circuit.

5. An electromechanical power transmission chain according to claim 4, wherein the capacitive circuit comprises an electric double layer capacitor.

6. An electromechanical power transmission chain according to claim 4, wherein the storage circuit comprises a battery element and a controllable direct voltage converter for transferring electrical energy between the capacitive circuit and the battery element.

7. An electromechanical power transmission chain according to claim 5, wherein the storage circuit comprises a battery element and a controllable direct voltage converter for transferring electrical energy between the capacitive circuit and the battery element.

8. A working machine comprising:
    a combustion engine,
    a functional element to be driven with mechanical power, and
    an electromechanical power transmission chain,
    the electromechanical power transmission chain comprising:
    an electrical machine having a rotor being in a torque transfer connection with a shaft of the combustion engine and with the functional element to be driven, operational efficiency of the combustion engine being better when power produced by the combustion engine is on a pre-determined power range than when the power produced by the combustion engine is above the predetermined power range,
    a storage circuit for storing electrical energy,
    an electronic power converter for transferring electrical energy between the storage circuit and the electrical machine, and
    a control system for controlling the combustion engine and the electronic power converter,
    wherein the control system is configured to control the electronic power converter to transfer electrical energy from the storage circuit to the electrical machine in response to a peak-load situation in which i) power demand of the functional element is above the pre-determined power range and ii) rotational speed is increased, so as to keep the power produced by the combustion engine on the pre-determined power range, and wherein the control system is configured to reduce a fuel injection amount per each working stroke of the combustion engine during the peak-load situation so as to restrain fuel consumption of the combustion engine from increasing in response to the peak-load situation.

9. A working machine according to claim 8, wherein the working machine comprises a hydraulic system and the functional element is a hydraulic pump of the hydraulic system.

10. A method for controlling an electromechanical power transmission chain that comprises:
    an electrical machine a having a rotor in a torque transfer connection with a shaft of a combustion engine and with a mechanical load to be driven, operational efficiency of the combustion engine being better when power produced by the combustion engine is on a pre-determined power range than when the power produced by the combustion engine is above the pre-determined power range, a storage circuit for storing electrical energy, and an electronic power converter for transferring electrical energy between the storage circuit and the electrical machine, the method comprising:

controlling the electronic power converter to transfer electrical energy from the storage circuit to the electrical machine in response to a peak-load situation in which i) power demand of the mechanical load is above the pre-determined power range and ii) rotational speed is increased, so as to keep the power produced by the combustion engine on the pre-determined power range, and limiting fuel supply of the combustion engine by reducing a fuel injection amount per each working stroke of the combustion engine during the peak-load situation so as to restrain fuel consumption of the combustion engine from increasing in response to the peak-load situation.

11. A method according to claim 10, wherein the method comprises interrupting the fuel supply of the combustion engine during the peak-load situation.

12. A method according to claim 10, wherein the method comprises limiting the fuel consumption of the combustion engine to be, during the peak-load situation, substantially a same as the fuel consumption on the pre-determined power range.

13. A non-transitory computer readable medium encoded with a computer program for controlling an electromechanical power transmission chain that comprises:

an electrical machine a having a rotor in a torque transfer connection with a shaft of a combustion engine and with a mechanical load to be driven, operational efficiency of the combustion engine being better when power produced by the combustion engine is on a pre-determined power range than when the power produced by the combustion engine is above the pre-determined power range, a storage circuit for storing electrical energy, and an electronic power converter for transferring electrical energy between the storage circuit and the electrical machine, the computer program comprising computer executable instructions for controlling a programmable processing system to:

control the electronic power converter to transfer electrical energy from the storage circuit to the electrical machine in response to a peak-load situation in which i) power demand of the mechanical load is above the pre-determined power range and ii) rotational speed is increased, so as to keep the power produced by the combustion engine on the pre-determined power range, and reduce a fuel injection amount per each working stroke of the combustion engine during the peak-load situation so as to restrain fuel consumption of the combustion engine from increasing in response to the peak-load situation.

14. A non-transitory computer readable medium according to claim 13, wherein the computer program comprises computer executable instructions for controlling the programmable processing system to interrupt the fuel supply of the combustion engine during the peak-load situation.

15. A non-transitory computer readable medium according to claim 13, wherein the computer program comprises computer executable instructions for controlling the programmable processing system to limit the fuel consumption of the combustion engine to be, during the peak-load situation, substantially a same as the fuel consumption on the pre-determined power range.

* * * * *